(12) United States Patent
Sridhar et al.

(10) Patent No.: US 12,294,888 B2
(45) Date of Patent: *May 6, 2025

(54) METHOD AND SYSTEM FOR MANAGING MOBILE NETWORK CONGESTION

(71) Applicant: Sandvine Corporation, Waterloo (CA)

(72) Inventors: Kamakshi Sridhar, Plano, TX (US); Lars Anton Gunnarsson, Bangkok (TH); Alexander Havang, Malmo (SE)

(*) Notice: Subject to any disclaimer, the term of this patent is extended or adjusted under 35 U.S.C. 154(b) by 0 days.

This patent is subject to a terminal disclaimer.

(21) Appl. No.: 18/351,895

(22) Filed: Jul. 13, 2023

(65) Prior Publication Data

US 2023/0362717 A1  Nov. 9, 2023

Related U.S. Application Data

(63) Continuation of application No. 17/394,829, filed on Aug. 5, 2021, now Pat. No. 11,743,762.

(Continued)

(30) Foreign Application Priority Data

Aug. 4, 2021 (EP) .................................... 21189733

(51) Int. Cl.
    *H04W 28/02*  (2009.01)
    *H04W 28/12*  (2009.01)

(52) U.S. Cl.
    CPC ... *H04W 28/0284* (2013.01); *H04W 28/0289* (2013.01); *H04W 28/12* (2013.01)

(58) Field of Classification Search
    CPC ........ H04L 47/24; H04L 47/11; H04W 24/08; H04W 28/02; H04W 28/12; H04W 28/0289; H04W 28/0284
    See application file for complete search history.

(56) References Cited

U.S. PATENT DOCUMENTS

| 6,928,472 B1 * | 8/2005 | Wen ..................... H04L 43/0864 |
| | | 370/242 |
| 10,021,713 B1 * | 7/2018 | Sevindik ............. H04W 72/566 |
| | (Continued) | |

FOREIGN PATENT DOCUMENTS

| WO | WO-2011088901 A1 * | 7/2011 | ......... H04L 12/5692 |
| WO | WO-2016184520 A1 * | 11/2016 | ............ H04W 24/02 |

OTHER PUBLICATIONS

Extended European Search Report, European Patent Office, on corresponding EP Application No. 21189733.5, dated Jan. 5, 2021.

*Primary Examiner* — Mehmood B. Khan
(74) *Attorney, Agent, or Firm* — Amarok IP Inc.; Neil W. Henderson

(57) ABSTRACT

A method for managing mobile network congestion including: determining cell metrics over a predetermined time interval for each cell of a plurality of cells; determining correlations between the cell metrics for each cell; determining whether any cell of the plurality of cell are congestion based on the correlations; determining a type of congestion for any cell determined to be congested; and determining traffic actions based on the type of congestion. A system for managing mobile network congestion having: a collection module configured to determine cell metrics over a predetermined time interval for each cell of a plurality of cells; a correlation module configured to determine correlations between the cell metrics; an analysis module configured to determine whether any cell is congestion based on the correlations and a type of congestion for any cell determined to be congested; and a traffic action module configured to determine traffic actions.

18 Claims, 13 Drawing Sheets

Related U.S. Application Data

(60) Provisional application No. 63/061,253, filed on Aug. 5, 2020.

(56) References Cited

U.S. PATENT DOCUMENTS

| | | | | |
|---|---|---|---|---|
| 11,743,762 B2* | 8/2023 | Sridhar | | H04W 28/02 |
| | | | | 370/229 |
| 11,924,680 B2* | 3/2024 | Karampatsis | | H04W 28/0289 |
| 2003/0231594 A1* | 12/2003 | Xu | | H04L 47/2408 |
| | | | | 370/236 |
| 2009/0252102 A1* | 10/2009 | Seidel | | H04W 84/18 |
| | | | | 370/329 |
| 2014/0160939 A1* | 6/2014 | Arad | | H04L 45/16 |
| | | | | 370/237 |
| 2015/0003246 A1* | 1/2015 | Chandramouli | | H04L 5/0064 |
| | | | | 370/235 |
| 2015/0195815 A1* | 7/2015 | Cucala Garcia | | H04W 72/04 |
| | | | | 370/329 |
| 2015/0263986 A1* | 9/2015 | Park | | H04L 41/0896 |
| | | | | 709/226 |
| 2016/0044530 A1* | 2/2016 | Cheng | | H04L 47/11 |
| | | | | 370/235 |
| 2016/0065419 A1* | 3/2016 | Szilagyi | | G06F 11/3409 |
| | | | | 709/224 |
| 2016/0381585 A1* | 12/2016 | Dudzinski | | H01Q 21/00 |
| | | | | 370/252 |
| 2017/0223574 A1 | 8/2017 | Watanabe et al. | | |
| 2017/0373950 A1* | 12/2017 | Szilagyi | | H04L 47/2416 |
| 2018/0160327 A1* | 6/2018 | Serrano Garcia | | H04W 24/08 |
| 2019/0364616 A1* | 11/2019 | Mishra | | H04W 88/16 |
| 2020/0029240 A1 | 1/2020 | Li et al. | | |
| 2020/0112876 A1* | 4/2020 | Sridhar | | H04W 28/0226 |
| 2020/0195539 A1 | 6/2020 | Sivaraj et al. | | |
| 2020/0195567 A1* | 6/2020 | Selvidge | | H04L 43/0882 |
| 2020/0229136 A1* | 7/2020 | Shan | | H04W 28/0236 |
| 2020/0351698 A1* | 11/2020 | Li | | H04W 24/02 |
| 2021/0289013 A1* | 9/2021 | Bentaleb | | H04N 21/44004 |
| 2023/0048559 A1* | 2/2023 | Karampatsis | | H04W 72/569 |
| 2023/0362717 A1* | 11/2023 | Sridhar | | H04W 28/02 |

* cited by examiner

METHOD AND SYSTEM FOR MANAGING MOBILE NETWORK CONGESTION

RELATED APPLICATIONS

This application claims the benefit of priority from U.S. Provisional Patent Application No. 63/061,253 filed Aug. 5, 2020 and European Patent Application No. 21189733.5 filed Aug. 4, 2021, and is a continuation of U.S. patent application Ser. No. 17/394,829 filed Aug. 5, 2021, all of which are hereby incorporated in their entirety herein.

FIELD

The present disclosure relates generally to computer network traffic. More particularly, the present disclosure relates to a system and method for mobile/radio access network congestion in a computer network.

BACKGROUND

Computer networks continue to expand and online traffic continues to grow with more people connecting through various types of devices. Growing consumption of streaming video applications, high bandwidth gaming applications, content download on increasingly bigger screen devices has led to increased network traffic, particularly in mobile networks. With traffic growing significantly year over year, mobile/radio access networks are getting increasingly congested. As traffic grows, network operators are upgrading their network to 5G, thereby incurring significant capital expenditure (CAPEX) in order to meet demands.

Without capacity upgrades, operators are faced with the prospect of customer churn due to poor Quality of Experience (QoE). Therefore the operators may be inclined to invest in new Radio Access Network (RAN) equipment and infrastructure (for example, additional base stations, routers, backhaul or the like). Operators generally try to manage the growing congestion within their telecom network while continuing to deliver sufficiently high QoE to the end-subscriber. If not managed properly, the traffic growth could result in poor subscriber QoE for applications such as Web download, gaming, streaming, or the like. Poor QoE has been shown to lead to subscriber churn. Unfortunately, operators do not generally have an easy way to assess if the radio access network is congested.

As such, there is a desire for an improved system and method for managing mobile/radio access network congestion.

The above information is presented as background information only to assist with an understanding of the present disclosure. No determination has been made, and no assertion is made, as to whether any of the above might be applicable as prior art with regard to the present disclosure.

SUMMARY

In a first aspect, there is provided a method for managing mobile network congestion, the method including: determining cell metrics over a predetermined time interval for each cell of a plurality of cells of the mobile network; determining correlations between the cell metrics for each cell; determining whether any cell of the plurality of cell are congestion based on the correlations; determining a type of congestion for any cell determined to be congested; and determining traffic actions based on the type of congestion.

In some cases, the mobile network may be a radio access network.

In some cases, cell metrics may include: subscriber metrics associated with each cell and traffic metrics associated with each cell.

In some cases, determining cell metrics may include: determining heavy users for each cell wherein a heavy user is a subscriber having throughput above a predetermined throughput threshold; and determining suffering users for each cell, wherein a suffering user is a subscriber having round trip time above a predetermined round trip time threshold.

In some cases traffic metrics may include: Throughput, Round Trip Time and Loss.

In some cases, the correlation may be a Pearson correlation between cell metrics and if the Pearson correlation is greater than a predetermined threshold the cell may be considered congested.

In some cases, a cell may be considered congested if the cell is experiencing higher than an average network number of heavy users, and of suffering users and a correlation between cell metrics above a predetermined threshold.

In some cases, a type of congestion may be backhaul congestion or cell congestion.

In some cases, if the type of congestion is backhaul congestion, the traffic action may be to reprioritize a traffic flow accessing the backhaul.

In another aspect, there is provided a system for managing mobile network congestion, the system having: a collection module configured to determine cell metrics over a predetermined time interval for each cell of a plurality of cells of the mobile network; a correlation module configured to determine correlations between the cell metrics for each cell; an analysis module configured to determine whether any cell of the plurality of cell are congestion based on the correlations and a type of congestion for any cell determined to be congested; and a traffic action module configured to determine traffic actions based on the type of congestion.

In some cases, the mobile network may be a radio access network.

In some cases, the collection module may be configured to determine: subscriber metrics associated with each cell and traffic metrics associated with each cell of the plurality of cells.

In some cases, the collection module may be further configured to: determine heavy users for each cell wherein a heavy user is a subscriber having throughput above a predetermined throughput threshold; and determine suffering users for each cell, wherein a suffering user is a subscriber having round trip time above a predetermined round trip time threshold.

In some cases, the collection module may be configured to determine Throughput, Round Trip Time and Loss.

In some cases, the correlation module may be configured to determine a Pearson correlation between cell metrics.

In some cases, if the Pearson correlation is greater than a predetermined threshold the cell may be considered congested.

In some cases, a cell may be considered congested if the cell is experiencing higher than an average network number of heavy users, and of suffering users and a correlation between cell metrics above a predetermined threshold.

In some cases, the analysis module is configured to determine whether the congestion is backhaul congestion or cell congestion.

In some cases, if the type of congestion is backhaul congestion, the traffic action module may be configured to reprioritize a traffic flow accessing the backhaul.

BRIEF DESCRIPTION OF FIGURES

The aspects and features of the present disclosure will become apparent to those ordinarily skilled in the art upon review of the following description of specific embodiments in conjunction with the accompanying figures.

Embodiments of the present disclosure will now be described, by way of example only, with reference to the attached Figures.

DETAILED DESCRIPTION

Generally, the present disclosure provides a method and system for managing mobile/radio access network congestion. Embodiments of the system and method are configured to collect cell metrics over a predetermined time interval, including determining heavy users and suffering users of the cell as well as traffic flow metrics, for example, round trip time (RTT), throughput, loss, and the like. In some cases, the system and method may further determine peak or busy hours of the cell. The system and method further determine correlations between the cell metrics and identify cells showing congestion based on the correlations. Embodiments of the system and method further determine the type of congestion for each of the cells showing congestion and determining traffic actions based on the type of congestion.

It will be understood that for fixed access networks such as Gigabit Passive Optical Networks (GPON) or Digital Subscriber Line (DSL), the available link bandwidth is constant and known. Detecting congestion in a radio access network (RAN) is unlike detecting congestion in fixed networks. The capacity of many mobile networks, and in particular a Long Term Evolution (LTE) mobile network is not a fixed number. The radio capacity may vary based on a number of factors, including, for example, where the users are located relative to a base station (sometimes referred to as a cell) and hence the path loss, the frequency band, the user mobility, and the like. Accordingly, the assessment of congestion cannot be made by comparing the capacity to a fixed number because the capacity number is not known and can vary. Traditionally, operators use spectral efficiency metrics like LTE will support for example 1.2 bits per second/Hertz (bps/Hz) and then the operator may multiply this metric by the spectral bandwidth to decide the total capacity that the RAN is able to carry. The problem with this approach is that this number is an average number and can vary widely depending on network factors, for example, the type of cell, user mobility, and the like.

Figure 1:
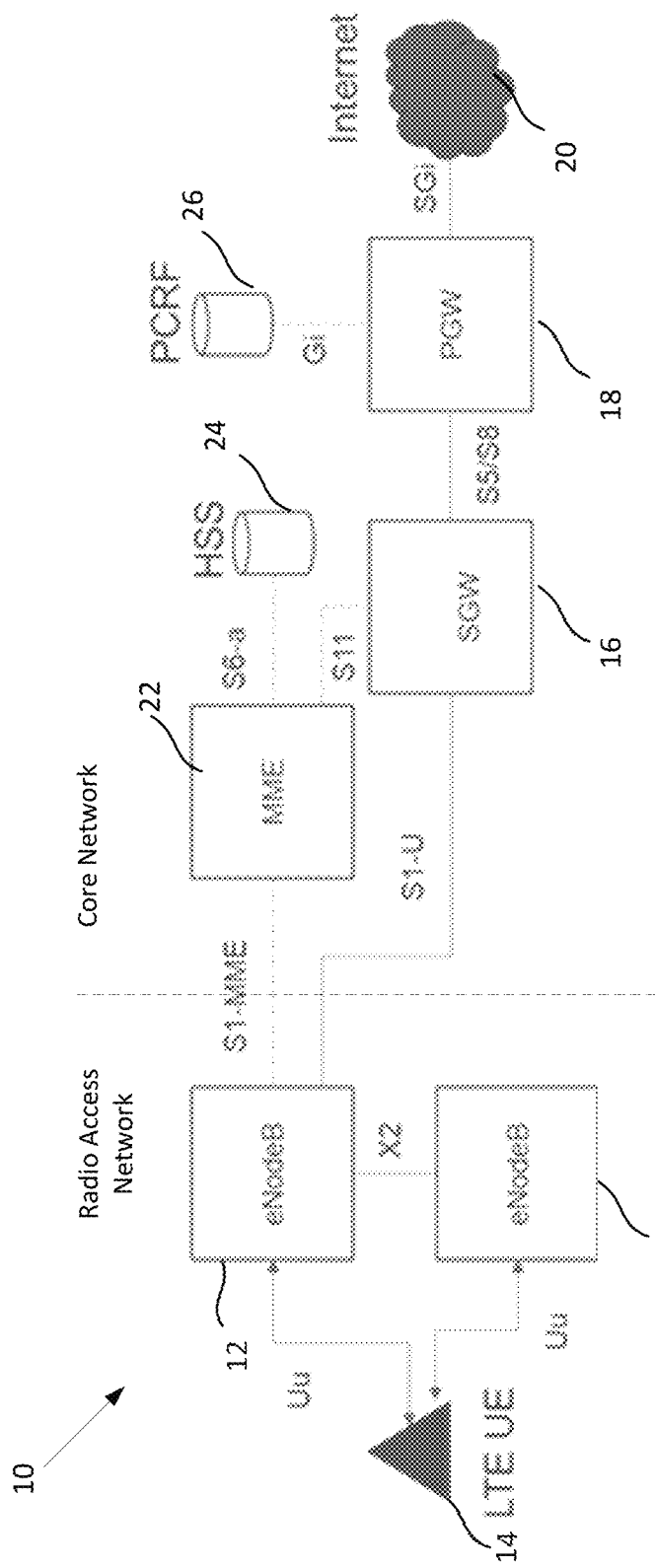
FIG. 1 illustrates a diagram of an LTE network

FIG. 1 shows a diagram of an example of a Long Term Evolution (LTE) radio access network 10 architecture. It will be understood that at least one Evolved Node Base station (eNB) 12 resides within the LTE Radio Access Network (RAN). The eNB 12 is configured to allocate the network resources among the various LTE users 14. The RAN is in communication with the core network. The eNB 12 connects to the core network via a serving gateway (SGW) 16 which is further in communication with a packet data network gateway (PGW) 18 which is in communication with the Internet 20. The LTE network 10 further includes a Mobility Management entity (MME) 22, which is configured to track the LTE users 14. The MME 22 interacts with a Home Subscriber Server (HSS) database 24 to provide information with respect to the various users 14 of the LTE network 10. The LTE network 10 includes a Policy and Charging Rules Function (PCRF) 26, which is intended to provide policy control and flow based charging decisions. It will be understood that FIG. 1 illustrates a high level network architecture and that an LTE mobile network may include further aspects not illustrated. The system and method described herein may further be applied to other networks, for example, LTE-A, 5G networks or other networks where the available link bandwidth may not be fixed, generally considered to be mobile networks.

Traffic from one or more eNB's 12 may be aggregated to the SGW 16 through a backhaul network and then onto the S1-U interface shown in FIG. 1.

Figure 2:
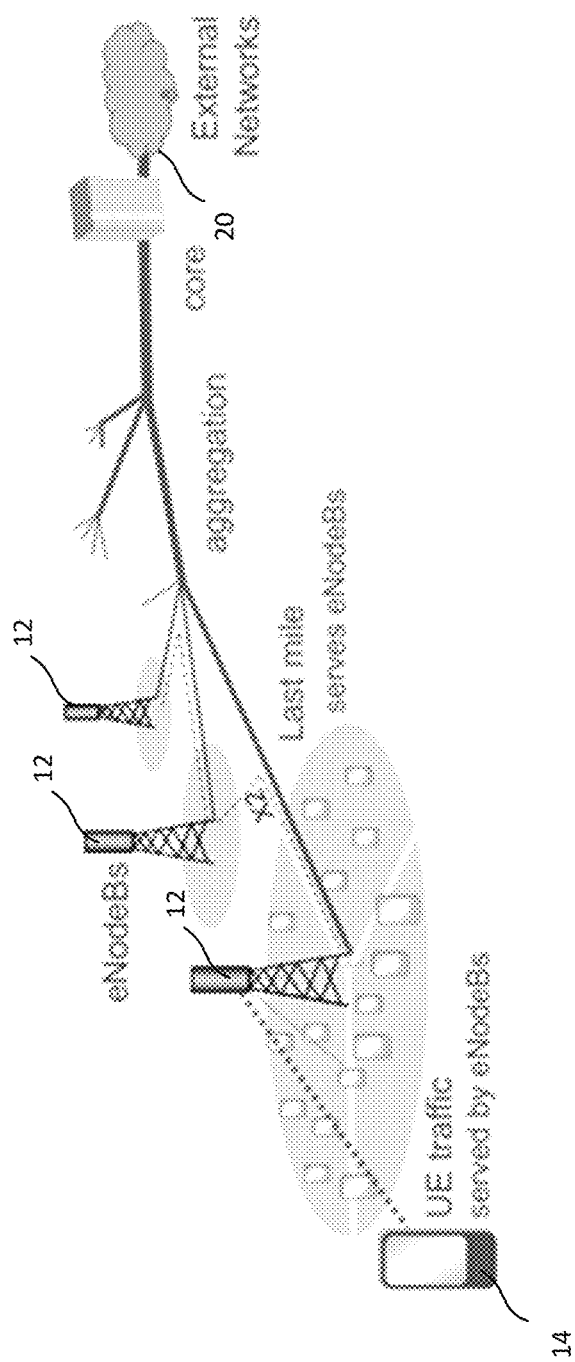
FIG. 2 illustrates backhaul links in a computer network.

FIG. 2 illustrates one example how traffic may be distributed from the SGW to the aggregation nodes (not shown in FIG. 1) and then onto the last mile access. Traffic from radio cells is backhauled to the SGW through fiber, or in some cases microwave backhaul. Often these links are fiber links, which are unlikely to reach congestion before the radio access network is congested. However, in many deployments, these backhauls links may be microwave or DSL links particularly in rural areas, or densely populated areas where it is much easier to install a microwave or DSL link rather than dig a fiber link. The microwave backhaul may get congested before the radio sites get congested. In particular, a backhaul may become congested when users are connected to the plurality of radio sites attached to the microwave backhaul link and are consuming high traffic.

Generally, when to upgrade a network's cell sites and backhaul is a big decision for a network operator. This decision is generally made when congestion starts to negatively impact user QoE. Upgrade of the radio cell sites involves significant CAPEX due to the need to purchase expensive radio equipment and spectrum. Likewise, an upgrade of the backhaul is also expensive. Thus, capacity planning is generally done to decide when to upgrade the network, and the capacity planning benefits from the congested cells be identified.

Radio capacity of an LTE radio access network is not a constant predefined number. In some cases, the capacity may vary depending on the spatial position of the active users relative to the base station, and/or to each other, the radio conditions, the contention level and the like. Spatial and temporal variations in the signal strength for each user, user mobility, types of applications being consumed downlink and uplink add to the difficulty in quantifying cell congestion.

Embodiments of the system and method detailed herein are intended to provide for a methodology to decide which radio cells are congested and which backhaul links are congested, and how severely each of these are congested. Once a congestion level is known, the network operator may be in a better position in order to either upgrade the network, reprioritize traffic, or perform other traffic actions in order to address the congestion level.

A conventional approach in determining congestion levels was to review Round Trip Time (RTT) increases. Assuming a certain baseline for an uncongested cell, increases in RTT may be used to detect congestion. However, absolute values of RTT may not be accurate as these depend on various network factors.

Other conventional solutions may require inputs such as Frame Utilization values from the base station (eNB) to decide if the radio network is congested. The interpretation of the Frame Utilization values depends on the specific eNB and therefore would need to be calibrated accordingly. Unfortunately, high frame utilization is not necessarily indicative of high congestion, and may lead a network operator to inappropriate consider the network cell as congested. High frame utilization means that the radio network resources are being actively used. Upgrading network equipment prior to the network operator being congested may not be an appropriate use of the network operator's capital.

Figure 3:
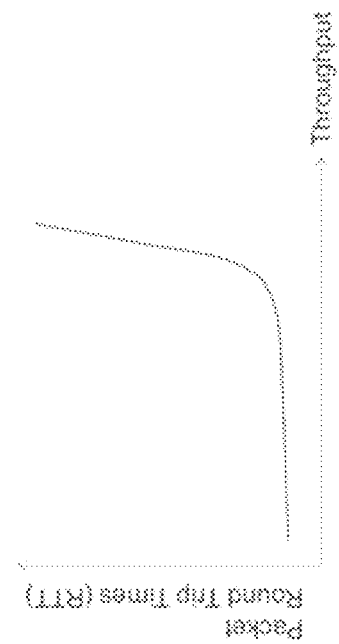
FIG. 3 is a graph illustrating packet Round Trip Time (RTT) vs. Throughput in a network link.

Another conventional approach considers using the knee of the round trip time (RTT) compared to throughput graph in order to decide whether the radio network is congestion. In a radio network, these measurements may be noisy. FIG. 3 illustrates a graph of RTT vs. throughput on an ideal curve of how the round-trip time of packets varies with varying link utilization. When the link utilization is low the round-trip-time is low. When the link utilization increases, the round-trip-time gradually increases. At some point as the input buffers fill up, the round-trip time increases sharply even with a small increase in link utilization.

Beyond the knee of the graph, increasing RAN congestion even in small amounts results in significant increase in round-trip-time. The knee of the round-trip-time versus the link bandwidth curve varies typically between 40% to 70% and may depend on the type of traffic being carried on the link. In some cases, for high bursty traffic, the knee may be at the lower end of the range, whereas for Poisson traffic, the knee may be at the upper end of the range. The drawback with this conventional approach is that the ideal 'smooth' curve shown in FIG. 3 is not seen unless the traffic is highly filtered out. Furthermore the knee of the curve may vary significantly depending on the type of the traffic. So using the knee of the curve to estimate the link bandwidth is not considered to be overly accurate.

Embodiments of the system and method detailed herein are intended to examine samples of traffic metrics (for example, throughput, round trip time (RTT), loss and the like) and the metrics' variations over a predetermined period of time (for example, over a peak busy hour), and over a day. In some cases, the correlation determination may be based on traffic metrics collected over, for example, a 24 hour period while the identification of heavy User and Suffering users, as detailed herein, may be made during peak hours. Embodiments of the system and method are configured to determine variations in the metrics as well as correlations between throughput, RTT and loss. These variations and correlations may be used to decide if a cell is congested or if the backhaul is congested. In some cases, the system and method are configured to use Pearson correlations between the traffic metrics and/or cell metrics.

Embodiments of the system and method are intended to filter out the noise without eliminating the indicators of cell congestion to help determine whether the radio access is congested or the backhaul is congested.

Figure 4:
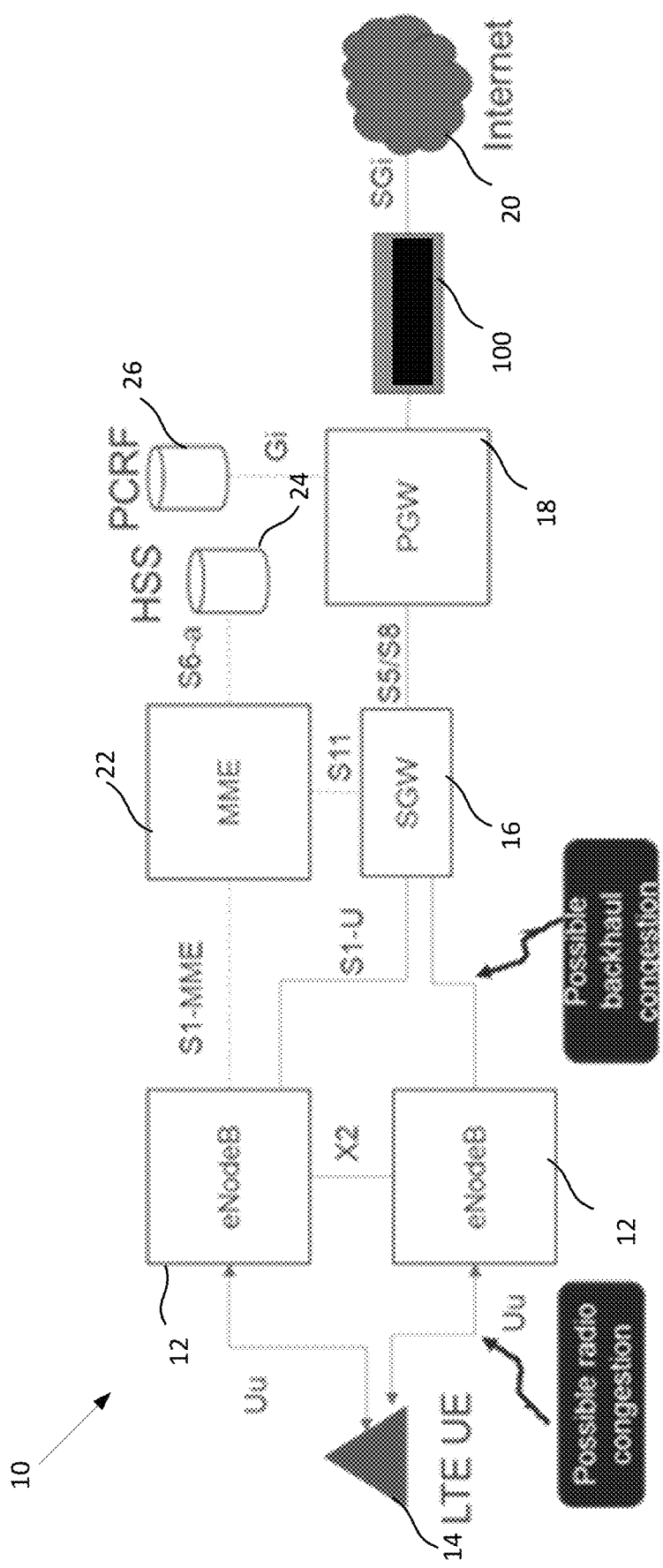
FIG. 4 illustrates an LTE network environment with a system for managing radio access network congestion.

FIG. 4 illustrates a possible location where the system 100 for managing radio access network congestion may reside in the network. In this example, four options are possible:
   i. On the SGi interface
   ii. Tap on the SGi interface
   iii. On the S1-U interface; and
   iv. Tap on the S1-U interface.

FIG. 4 illustrates the system 100 on the SGi interface. It will be understood that the system may alternately reside on other interfaces or may be distributed. The system 100 for radio access network congestion management is intended to reside in the core network. It will be understood that in some cases the system may be a physical network device, or may be a virtual network device. In some cases, the system 100 may send data to the cloud to be processed or the system may process the data internally. One of skill in the art will understand that cloud processing includes processing by one or more remote processors and use of remote memory to store data during processing.

Figure 5:
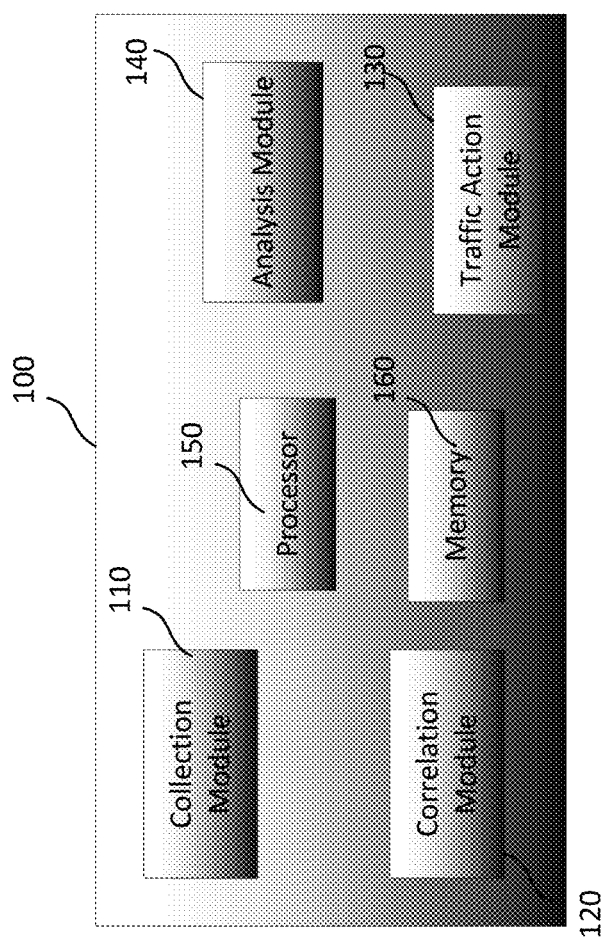
FIG. 5 illustrates a system for managing radio access network congestion according to an embodiment.

FIG. 5 illustrates an embodiment of a system 100 for managing radio access network congestion. The system includes a collection module 110, a correlation module 120, an analysis module 130, a traffic action module 140, at least one processor 150 and at least one memory component 160. The system is generally intended to reside on the core network but may be distributed. The modules, including the processor 150 and memory 160, are in communication with each other but may be distributed over various network devices or may be housed within a single network device. The system 100 is intended to receive information from the computer network equipment that allows the system to determine traffic flow metrics, including, for example, throughput, round trip time, and loss.

The collection module 110 is configured to collect various cell metrics and traffic flow metric measurements associated with the traffic flow and the cells in the network. The collection module 110 may further be configured to determine Average number of users, Heavy Users (HU), Suffering Users (HU), Average user RTT, Throughput and loss over a predetermined time interval, for example, every 2 minutes, every 5 minutes, every 10 minutes or the like.

A Heavy User is a subscriber who, by virtue of his/her radio channel condition, is allocated a significantly high proportion of the radio network resources. As a result, such a user is able to realize very high throughputs with a very low round-trip-time, even though such a disproportional allocation of resources may not necessarily be needed to achieve a good application QoE. A heavy user is entitled "heavy as their usage of network resources is much higher than what is generally considered to be needed for a good QoE for his/her respective applications.

A Suffering User is a subscriber who, by virtue of his/her radio channel conditions, is unable to avail of a reasonable proportion of the radio network resources. As a result of suboptimal allocation of radio resources over time, such a user gets a very low throughput with a very high round-trip-time which is likely to result in poor application QoE. The suffering user's high round-trip time is a result of poor channel condition resulting in packet drops and retransmissions. Such a user gets a disproportionally low allocation of network resources and is therefore unlikely to achieve a good QoE. Hence this user may be considered a suffering user because his/her QoE suffers.

In some cases, the rank of a heavy user is measured by the standard deviation of their average Throughput relative to the many other users in the cell, and can be considered to have throughput above a predetermined throughput threshold. The rank may not have a unit but is intended to be used to classify which subscribers can be considered heavy users.

In some cases, the rank of a suffering user is measured by the standard deviation of their average Round Trip Time relative to the many other users in the cell and can be considered to have round trip time above a predetermined throughput threshold The rank does not have a unit but is intended to be used to classify which subscribers can be considered suffering users.

The correlation module 120 is configured to calculate correlations between various metrics, for example, between throughput and RTT and throughput and loss. The correlation module 120 may then map or plot the correlations versus heavy users as well as the correlations versus suffering users. In some cases, Pearson's correlation will be used, but other correlation techniques, for example, Quotient correlation may also be used.

The analysis module 130 is configured to determine which cells may be suffering from backhaul congestion and which cells may be suffering from radio access network congestion based on the correlations and the plotted data. In some cases, the analysis module 130 is further configured to aggregate the results over a plurality of days to determine trends of various cells in the network.

The traffic action module 140 is configured to perform necessary traffic actions given the congestion results from the analysis module. In some cases the traffic action module 140 may alert the network operator of cells that are congested and may require upgrading. In other cases, where backhaul congestion is determined, the traffic action module may perform or may provide instructions to shape traffic or reprioritize traffic associated with a backhaul.

Figure 6:
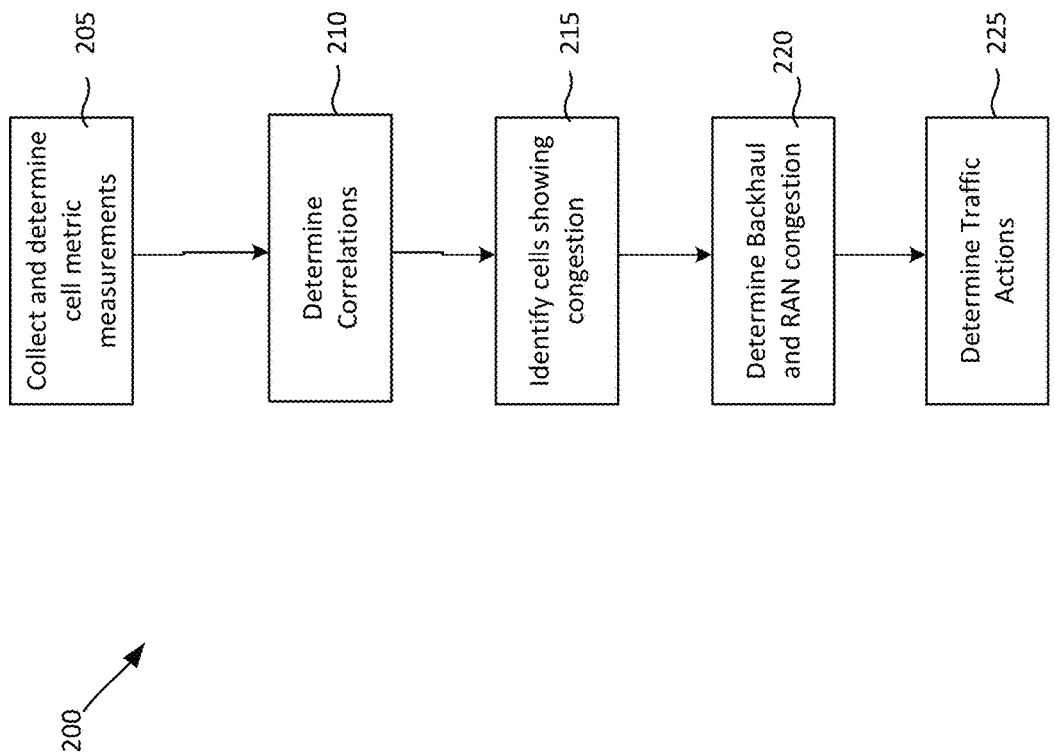
FIG. 6 illustrates a method for managing radio access network congestion according to another embodiment.

FIG. 6 is a flow chart illustrating a method 200 for radio access network congestion management. The collection module 110 is configured to collect traffic flow metrics, for example, round trip time, through put, loss, and the like over a predetermined time interval, at 205. The collection module may further collect or determine cell metrics, for example, heavy users (HU) and suffering users (SU) as detailed herein. The correlation module 120 is configured to determine various correlations, at 210, based on the traffic flow metrics and cell metrics. The correlation module 120 may determine which cells have the high correlation and high number of HU. Of those cells, the correlation module 120 may determine which cells have the high correlation and high number of SU. Of the remaining cells, the correlation module 120 may identify which cells have high throughput to Loss correlation and filter them out. From these cells, the analysis module 130, may identify which cells have Backhaul congestion and which cells have radio access network congestion, at 220. Once the congested cells are identified, the traffic action module 140, may determine an appropriate traffic action, at 225. In some cases, the traffic action may be to shape or reprioritize traffic flows. In other cases, the traffic action may be to report or otherwise alert the network operator of a congested cell or backhaul which requires greater capacity or an upgrade. In cases where the upgrade is not possible immediately, the operator may offer lower cost incentive data plans to prevent customers from churning during due to poor QoE.

Figure 7:
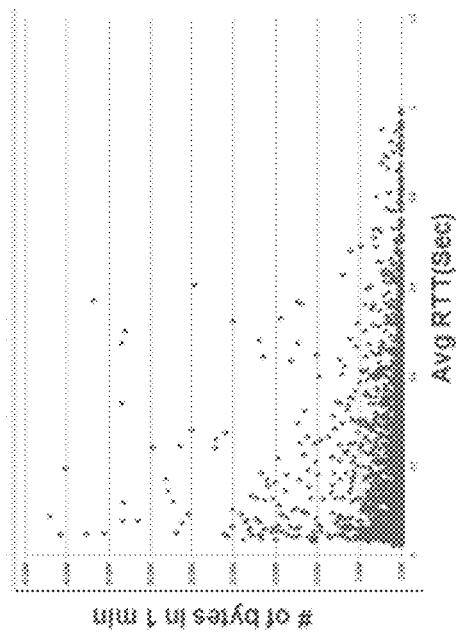
FIG. 7 is a graph illustrating measurements of Throughput vs. packet RTT on an SGi interface.

FIG. 7 shows measurements taken on an SGi interface for a given LTE cell showing the distribution of users. The X axis is the per subscriber average RTT of packets of one or more flows. The Y axis is the per subscriber number of bytes sent in 1 minute intervals over one or more flows. The Y axis is a direct representation of the aggregate throughput, as it will be understood that bytes/time is throughput. This packet throughput and RTT distribution is typical of LTE networks because of LTE has an orthogonal frequency-division multiplexing (OFDM) radio interface. A few users, the Heavy Users, may be able to consume significant radio resources leaving many other users with fewer radio resources allocated. These clusters have a distinctive visual pattern. Heavy users and users with poor QoE (or Suffering Users) may be viewed as outliers.

Users who are in good channel conditions may be able to get incrementally more radio resources most of the time. Over time, this cumulatively aggregates for long duration flows. As a result, a few users (for example, 5% of users, sometimes consider the Heavy Users) are able to get significantly larger proportion of the radio resources compared to other users resulting in much higher sustained throughputs over longer durations. This effect may results in very good QoE for a few users and poor QoE for several other users. This may be particularly exacerbated for long duration flows.

Figure 8:
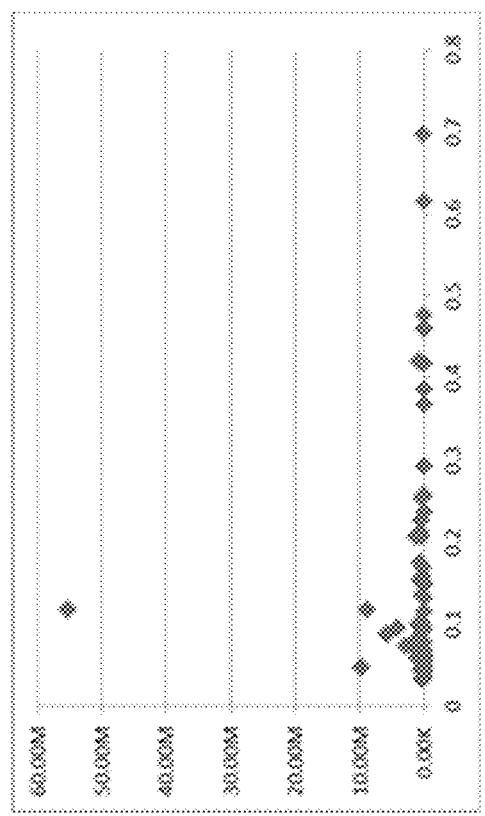
FIG. 8 is a graph illustrating network measurements of Throughput vs. packet RTT on an SGi Interface.

FIG. 8 is a more simplified example of RTT vs. Throughput on a network, similar to FIG. 7. FIG. 8 illustrates examples of measurements taken in a single LTE cells in a Tier 1 mobile operator network to illustrate a similar behavior where a few users are able to receive really high quality of experience (QoE), the users with high throughput and low latency, whereas there are other users with poor QoE, the users with low throughput and high latency.

Figure 9:
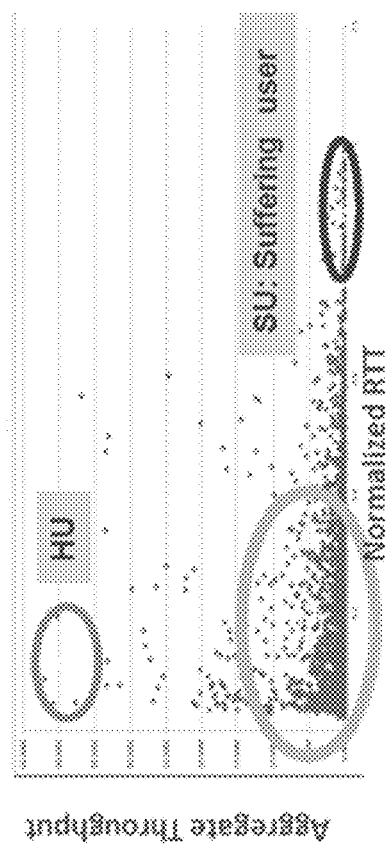
FIG. 9 illustrates an identification of heavy users and suffering users.
Figure 10:
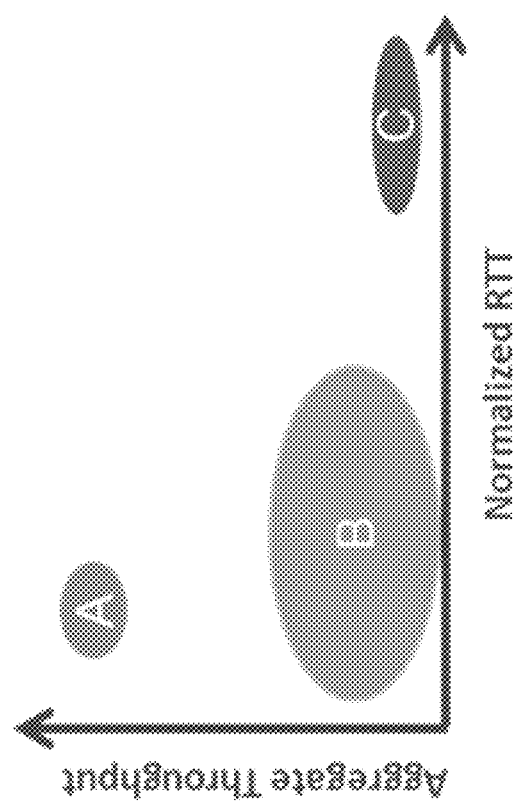
FIG. 10 illustrates a simplified graph of an identification of heavy users and suffering users.

FIGS. 9 and 10 illustrate the classification of users into heavy users and suffering users based on Throughput and RTT metrics collected from each packet that passes through the system 100.

In some cases, the determination of Heavy Users (HU) may be determined as follows. First a User throughput ranks is determined.

$$User\_Throughput\_Rank=(Throughput\_user-Throughput\_mean)/Throughput\_stddev$$

Further, the throughput per user may be defined as, for example Throughput_user=bytes sent in a predetermined time interval. In the examples that follow, the predetermined time interval may be, for example, 5 minutes. It will be understood that other time intervals, for example, 1 minute, 5 minutes, 10 minutes or other configurable time interval determined by the network operator, may be used.

The throughput estimate is calculated by counting the number of bytes sent over the SGi or S1-U interface towards a cell. This measurement may be obtained by summing the bytes of traffic sent to all subscribers associated with a particular cell over a specific interval. The throughput is then calculated by bytes/time.

The RTT is the time it takes for a packet to go from the SGi interface towards the UE and back.

Each subscriber may launch multiple flows. For each flow, the system is configured to count the RTT of packets sent during the predetermined time interval (the time interval is intended to be configurable and is shown as 5 minutes in this example). The average of the RTT estimates is the RTT assumed over the 5 min, for that flow. If a subscriber has multiple flows, then the average of all the RTT estimates sent over all the flows is determined as the average RTT for the subscriber.

The system is then configured to determine the mean value of the all the user throughputs (Throughput_mean) and determine the standard deviation of all the user Throughputs (Throughput_stddev). Then, for a given user, the system can determine the User_Throughput_rank.

All users that have User_Throughput_Rank greater than a predetermined HU rank threshold, for example, 1 or 1.5 or 2 (or another rank set by the network operator) are considered as heavy users (HU).

The system is further configured to determine Suffering Users (SU) as User_RTT_rank:

$$User\_RTT\_Rank = (RTT\_user - RTT\_mean)/RTT\_stddev$$

RTT_user is the average of all RTT samples for that user in the configurable time say 5 min. The system is configured to determine a mean value of the all the users RTTs (RTT_mean) and a standard deviation of all the user RTTs (RTT_stddev). Then, for a given user the system may determine the User_RTT_rank. All users that have User_RTT_Rank greater than a predetermined SU rank threshold, for example, 1 or 1.5 or 2 or another rank set by the network operator, are considered as suffering users (SU).

The system may then determine at specific periodic intervals, for example, every 5 min, collect throughput, RTT and loss samples. The examples defined herein are intended to reference 5 minute intervals, but it will be understood that the intervals could be 1 minute, 2 minutes, 5 minutes, 10 minute or the like. In some cases, the network operator may configure the periodic intervals.

The system may collect traffic metrics (sometimes referred to as packet measurements). Once the traffic metrics are collected, each day, the system determines the time of the day when the throughput was the highest. This is referred to as the peak busy hour interval. The peak busy hour interval is the 1 or 2 hour time of the day during the previous day when the traffic volume was the highest.

The system may determine, for each cell site, during peak busy hour (in an example, it may be 1-3 PM) every 5 min: Average number of users, Heavy Users (HU), Suffering Users (HU), Average user RTT, Throughput and Loss over the predetermined time interval. Other cell and traffic flow metrics may also be determined or collected by the system.

Each day, if 5 minute intervals are used, there will be 288 samples. The system may then determine a Pearson's correlation between Throughput and RTT, as well as a Pearson's correlation between Throughput and Loss. It will be understood that the Pearson's correlation is used in this example. In general, other correlation techniques, for example, Quotient correlation may be used. The correlation technique is intended to be able to test the strength of the dependence between the two selected variables.

The system may further identify candidate cells and/or backhaul links that are congested. In some cases, the system may map or plot Pearson's correlation versus HU and plot Pearson's correlation versus SU. For a cell to be declared by the system to be congested, three conditions are generally met. In particular, there is intended to be a higher numbers of heavy users, higher number of suffering users and higher Pearson correlation between throughput and RTT than a predetermined threshold for each. In some cases, the threshold for heavy users and suffering users may be configured by the network operator. In some cases, the threshold for heavy users and suffering users may be configured by cell site or region depending on the distribution of users at the cell site or within the region. In some cases, both the threshold for heavy user and suffering users may be between 5% and 25%. In some cases, the thresholds for heavy user and suffering users may be the same while in other cases, the threshold for heavy users and suffering users may be different.

Pearson correlation varies between −1 to +1. In this example, negative values of Pearson correlation imply that when Throughput goes up, RTT goes down. Positive values of Pearson correlation would imply that when Throughput goes up, RTT goes up. The higher the absolute value of the number the stronger the correlation. The correlation measurements may also be used to measure correlation between Throughput and Loss, which is intended to isolate cases of Backhaul congestion.

The system may then filter out cells that may be congested due to their Backhaul being congested. The cells identified via the correlation results are cells that may have either radio access congestion, or backhaul congestion. To determine if the congestion is due to the Radio Access or due to the Backhaul, the system may determine the Pearson's correlation for those specific cells, between Throughput and Packet Loss.

If the Pearson's correlation between Throughput and Loss is higher than a predetermined threshold, for example higher than 0.5, 0.6, 0.75 or another configurable value selected by the network operator then it is likely due to the Backhaul being congested.

The remaining cells may be determined to be suffering from Radio Access congestion. Some cells may have both radio congestion and backhaul congestion and may have both a high number of HU, SU with high Pearson's correlation between Throughput and RTT, and a high Pearson's correlation between Throughput and Loss.

The embodiments of the system and method provided herein are intended to determine when an LTE macro or small cell is congested each day, and whether the Backhaul is congested without needing external input on the cell type, or spectrum bandwidth, type of backhaul, or the like.

Embodiments of the system and method are intended to determine LTE cell congestion irrespective of the distance between the user and the base station, packet core and the base station, the number of users in the cell, the mobility of the users within the cell, or the type of applications used by the user, or the like.

Embodiments of the system and method may fine-tune and updates the estimate of LTE cell congestion and Backhaul congestion on a periodic basis (for example, daily, every 3 days, weekly or the like), and can be done offline.

This embodiment describes a set of definitions of Throughput, Loss and Latency. Alternate definitions may be used in a different embodiment, and would be understood to be used in combination with or instead of Throughput, Loss and Latency.

In a specific example, the system collects network metric measurements each day.

For each day, the system determines the time of day when the throughput was the highest the previous day. This is referred to as the peak busy hour interval. The peak busy hour interval is the 1 or 2 hour time of the day during the previous day when the traffic volume was the highest. It will be understood that other time periods may also be used and that the calculation may be done every other day or at other intervals.

In this example, for each cell-site a plurality of cell metrics and traffic flow metrics are measured, for example, average number of users, heavy users, suffering user, average user RTT, Throughput over the interval, and loss. Other appropriate parameters may be determined and used in other embodiments.

During peak busy hour (for example between 1-3 PM) for every predetermined period (for example, every 5 min), determine an average number of users. The size of the cell for the entire day is measured by the average number of users over the entire day. Average number of users=total number of users in the 24 hours divided by 24 hours. The Heavy Users and Suffering Users may be determined for the busy hour (based on the previous day's observation of when the throughput was the highest). Every predetermined interval, which in this example is 5 minutes, a sample is obtained of the number of suffering users and the total number of users during those 5 minutes.

In 1 hour, 12 samples of the number of SUs would be available. At the end of say 2 busy hours, the 5 minute SU samples (24 in a 2 hour window) are averaged to get a single number for the average number of SUs. Likewise, at the end of the busy hour a single number is obtained of the average number of HUs.

In some cases, the system may determine every 5 minutes a total number of users for the sampling interval of 5 min. This measurement may be used to compute the average value of SU/total number of users, and average value of HU/total number of users.

The ratio of SU/total number of users can be determined every 5 min, and averaged for the peak busy hours duration. Further, the ratio of HU/total number of users can be computed every 5 min, and averaged for the peak busy hours duration.

The system, via the collection module, may further determine an average user RTT. Each day in 24 hours, with 5 min sampling, there will be 288 samples. For each of the 5 minutes, the total number of users may be different. Average RTT per user every 5 min is the sum of the RTT of all the users for that 5 minute interval divided by the number of users during that 5 minute interval. It will be understood that if a different time interval is used, a different number of samples will be collected, but the method to determine the average will remain similar.

The system, via the collection module, may further determine or collect throughput measurements over the 5 min interval. The throughput may be the total throughput in the cell for that 5 minute interval divided by 5 min. Similarly, the system may determine or collect loss measurements. The loss is the measured packet drops during the 5 min interval.

Packet drops are typically identifiable through retransmissions, or gaps in the TCP sequences, of packets received in the Inbound external and Outbound internal traffic. In the incoming (Inbound external and Outbound internal) traffic, packet drops are identifiable as gaps in the TCP sequences. It will be understood that Inbound external traffic is traffic from an external source flowing inbound to into the service provider or network provider's network. Outbound internal traffic is intended to originate from within the network and is intended for an external recipient.

The measurements of Average user RTT, throughput over the 5 min interval and Loss can be used to compute Pearson's correlation between Throughput and average RTT. The Pearson's correlation is a single number for the entire day obtained by correlating the 288 samples of Throughput and Average user RTT. Likewise, the Pearson's correlation for the day between Throughput and Loss can be obtained for the day.

The system may then further determine candidate cells or backhaul links that are congested. The system's correlation module determines the Pearson's correlation between Throughput and RTT. The correlation module further determines the Pearson's correlation between Throughput and Loss.

Figure 11:
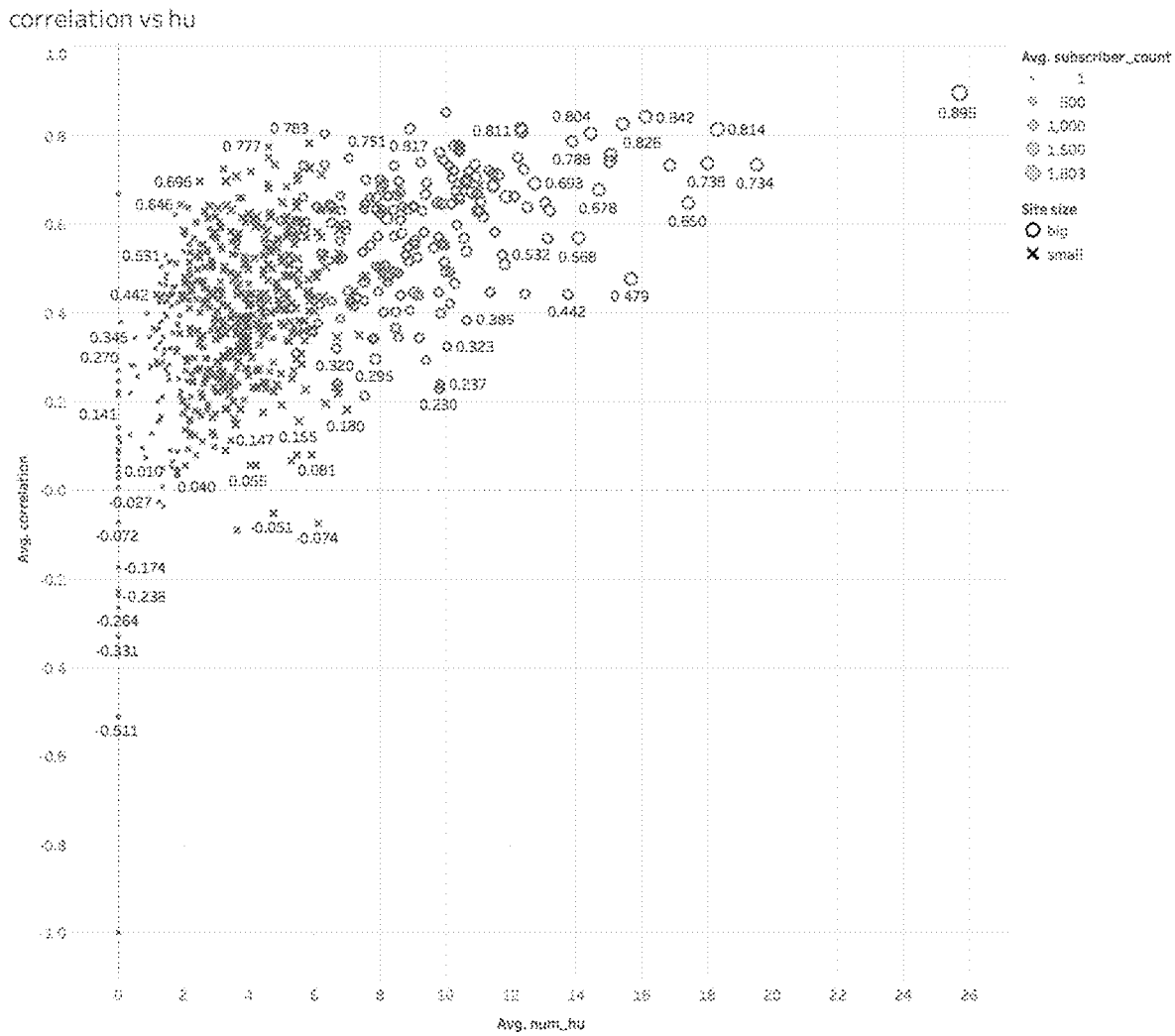
FIG. 11 is a graph illustrating daily Pearson's correlation vs. average number of heavy users.

FIG. 11 is a graph illustrating the Pearson's Correlation versus average number of HU for a single day. The Y axis is the correlation number obtained by Pearson correlating throughput and RTT samples over the entire 24 hour period. The X axis is the number of HUs.

Each number adjacent to a base station indicates the Pearson's correlation between Throughput and RTT for a given day. The size of the bubble indicates the size of the cells.

Figure 12:
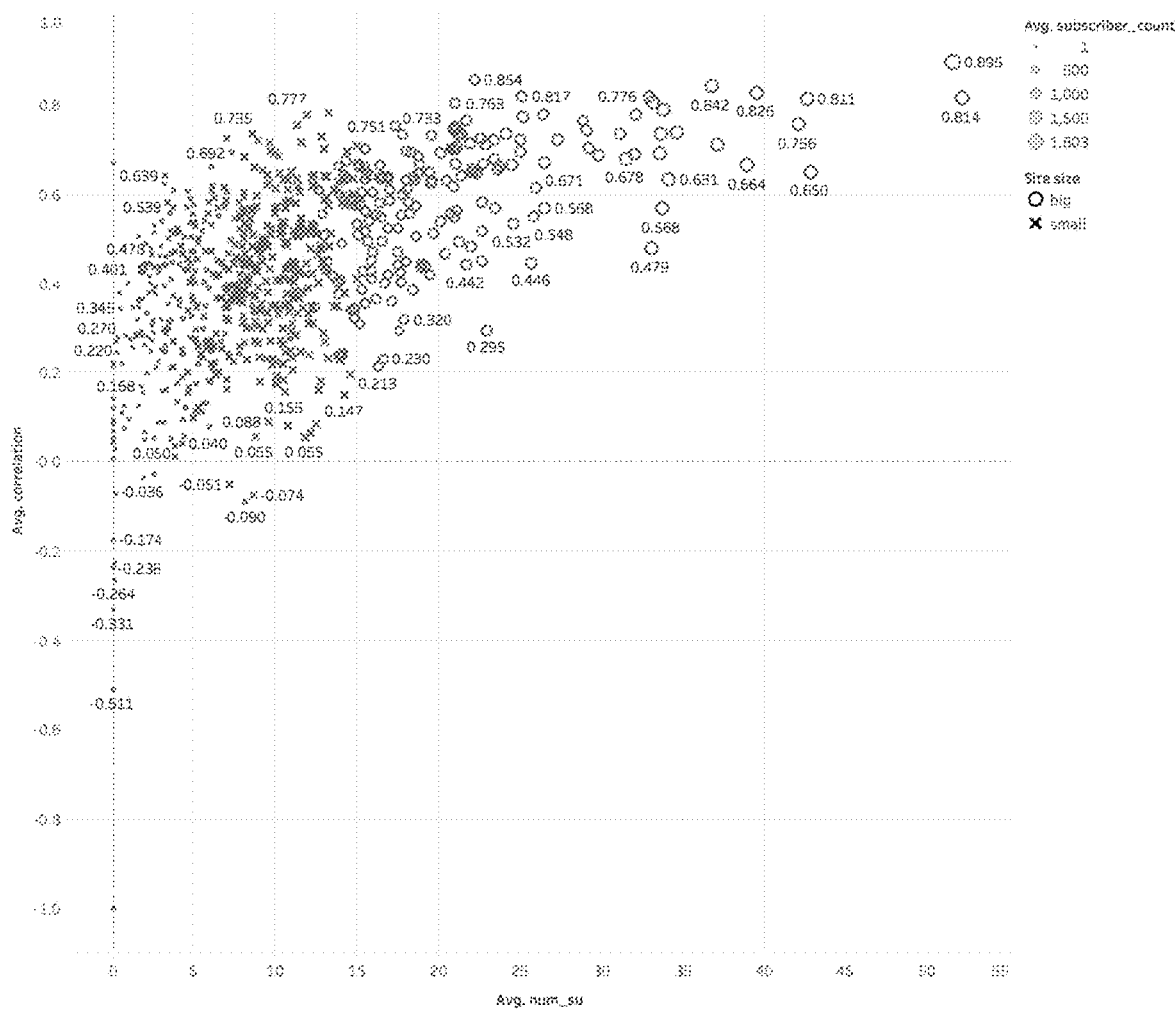
FIG. 12 is a graph illustrating daily Pearson's correlation vs. average number of suffering users.

FIG. 12 shows the Pearson's Correlation versus average number of SUs for a single day. Bigger cells with larger subscriber count are indicated by a larger size bubble. Such cells will likely have more SUs and will show a higher correlation between Throughput and RTT. Smaller cells (lower subscriber count) have fewer SUs with Lower correlation between Throughput and RTT.

Congested cells are those that have high Pearson's correlation and a high number of suffering users. The two representations of FIGS. 11 and 12 can be optionally and additionally viewed with the measurements in FIG. 13. The measurements in FIG. 13 combine the measurements in FIGS. 11 and 12, and may not be necessary in order to determine which cells are congested.

The total cell throughput and average RTT across all the users in the cell may also be plotted over time. When plotted over time, the system, via for example the analysis module, may be able to determine trends of various cells, for example, which cells are slowly getting more congested, which cells have different usage patterns over various days, or the like. Daily Pearson's correlation between various metrics may also be used to aggregate traffic statistics when looking at long term trends for a cell.

Figure 14:
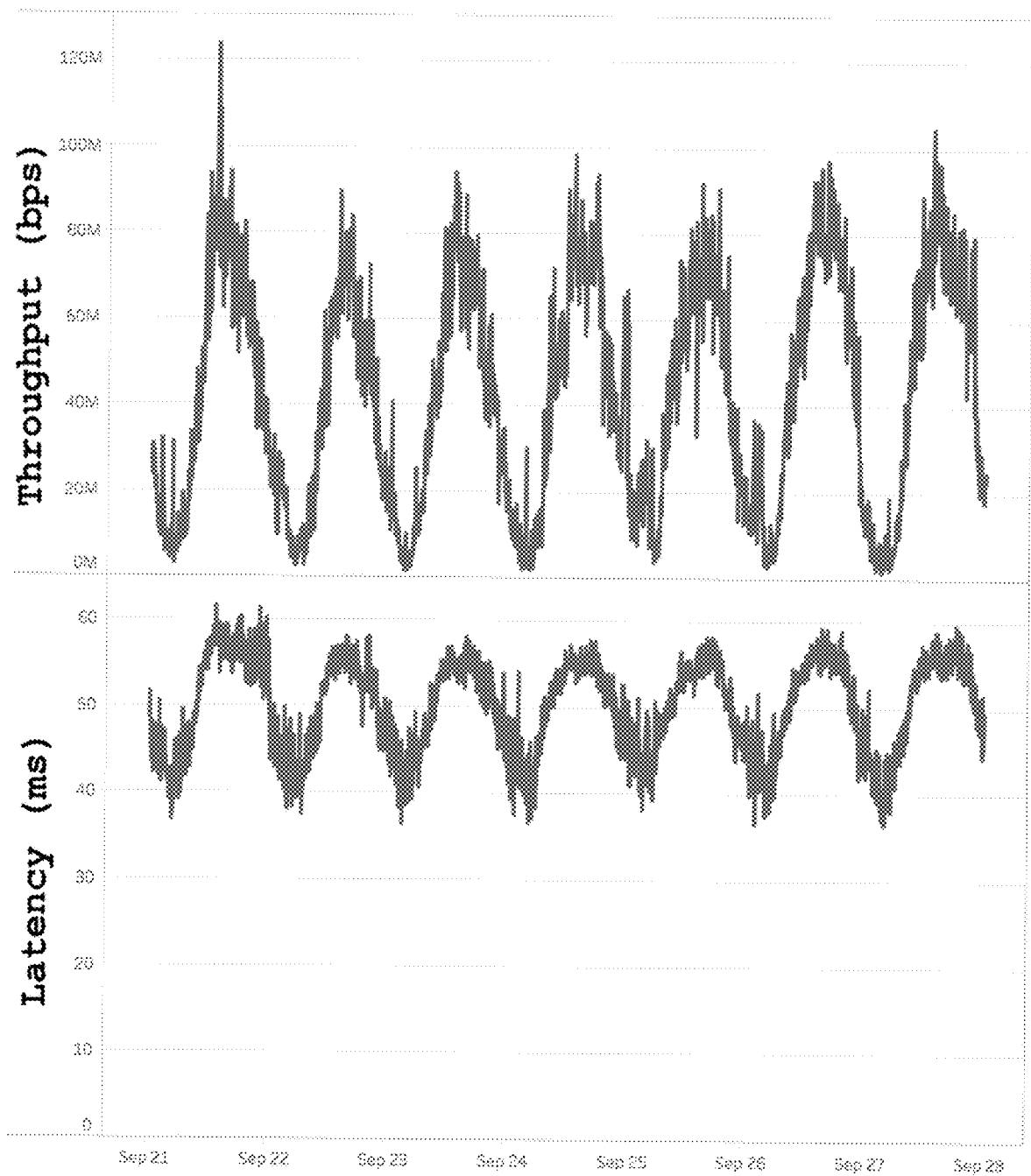
FIG. 14 is a graph illustrating an example of high Pearson's correlation between throughput and RTT according to an embodiment.
Figure 15:
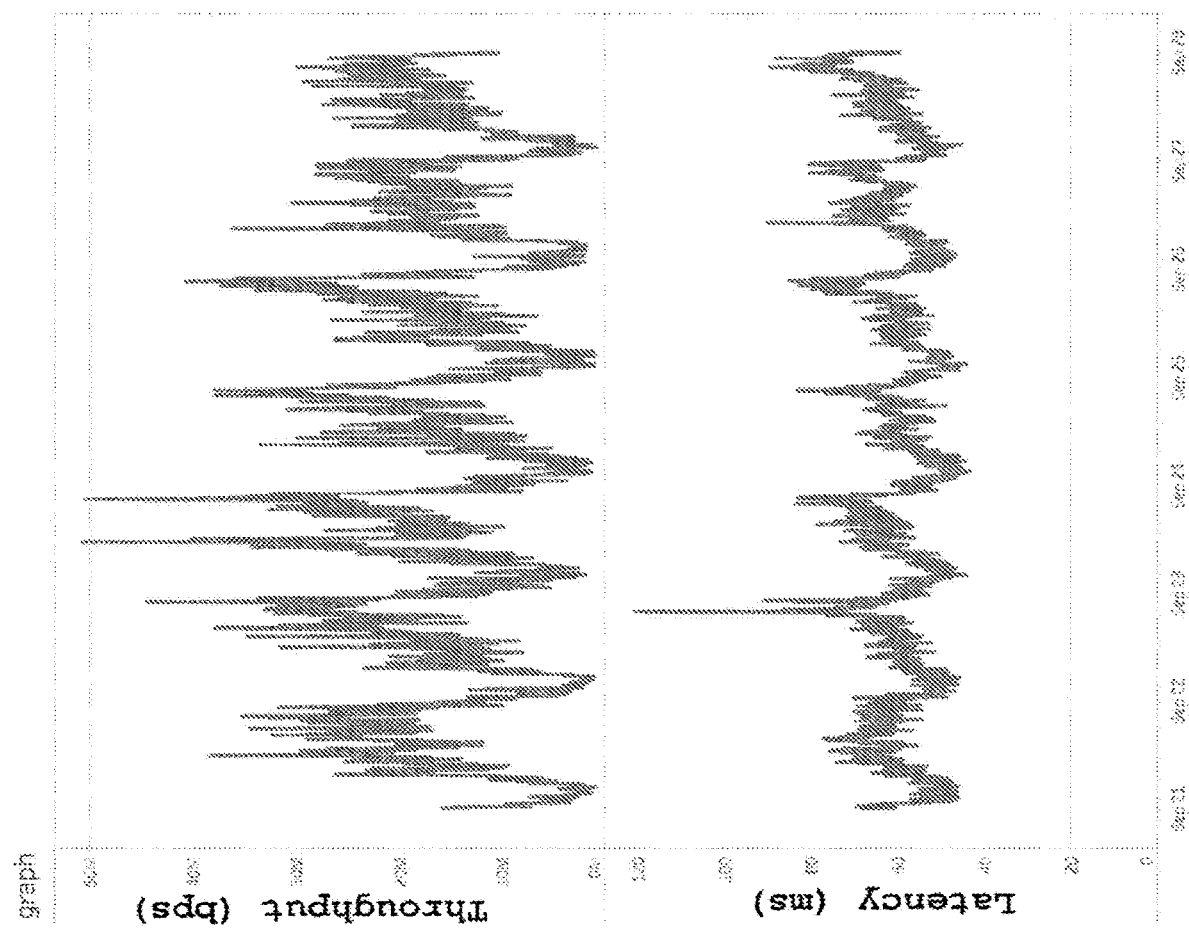
FIG. 15 is a graph illustrating high correlation between Throughput and RTT for one cell and low Pearson's correlation for another cell according to another embodiment.

FIGS. 14 and 15 are provided to visually illustrate high and low Pearson's correlation. Throughput and RTT variation across several days for a given cell site are shown. In FIG. 14, high correlation is shown between Throughput and RTT samples, for each of the days. Using Pearson Correlation, a correlation number is computed each day, for example, 0.7.

FIG. 15 illustrates an example of Throughput and RTT variation across multiple days for another cell, with low Pearson's correlation between Throughput and RTT samples for each of the days.

As the method for managing radio access network congestion proceeds, results, for example the plotted data shown in FIG. 11 for the previous 24 hours during the peak hour may be reviewed. The method may select cells with high Pearson's correlation and high number of HU from FIG. 11. The number of cells selected may be based on the correlation threshold, which in the case may be 0.7. The threshold may be configurable. In some cases, a Pearson correlation range of between approximately 0.4 and higher (for example, up to 1) can be construed as being indicative of congestion. The higher the Pearson correlation, the stronger is the indication of congestion. It will be understood that the threshold is intended to be greater than 0.

The system may then identify a set of cells of size>minimum number of users and with a Pearson correlation >0.7. The selected minimum number of users may be dependent on the network operator and may vary depending on the type of network and the resources available. This threshold of 0.7 indicates that when the throughput goes up, the RTT goes up.

For those identified cells, from FIG. 12, examine the number of Suffering Users for those corresponding cells. The number of suffering users should be greater than an SU threshold, for example 5, 10, 15 or the like. This threshold, configurable by the operator, indicates the value beyond which the Operator is willing to make a decision to either invest CAPEX in adding more cell sites or taking traffic management actions, for exampling shaping or prioritizing traffic flows.

Figure 13:
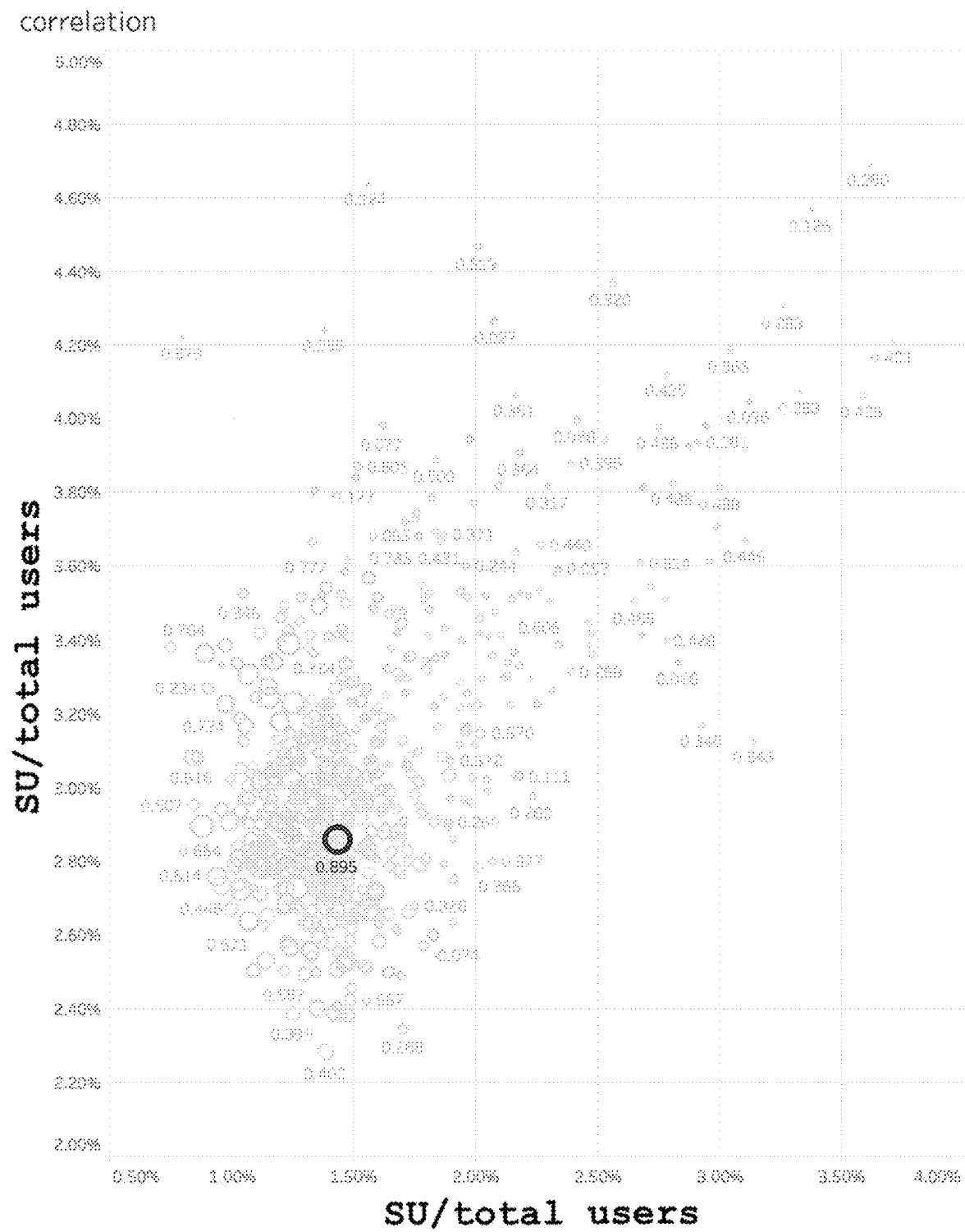
FIG. 13 is a graph illustrating Pearson's correlation for different cell sites.

From FIG. 13, it can be seen that small cells may have higher fraction of HU/total number of users or SU/total number of users because the total number of users is very small. In a large cell, the HU percentage can be small but a few HU cause many SU.

The system may then examine the set of selected cells day after day for several days. Depending on the results, the system may determine that these cells have either cell congestion or backhaul congestion. The system may then determine that there is a set of selected cells that are consistently congested day after day.

After filtering out those cells that have high Pearson's correlation between throughput and RTT, and high number of HU and SU, the system may further determine which of the cells are likely to be suffering from backhaul congestion.

To determine whether the issue is likely backhaul congestion, the system may identify cells that have high Throughput versus Loss correlation. eNB Packet Data Convergence Protocol (PDCP) has huge buffers because the radio is designed to accept long periods when channel conditions are poor, and when there are several users competing for the limit scheduler resources. In backhaul, packets will drop because the buffer depths are smaller than the PDCP. Thus in backhaul, congestion manifests as high packet loss, even if the latency remains low or modestly low. As such, the system is able to identify cells more likely suffering from backhaul congestion.

Figure 16:
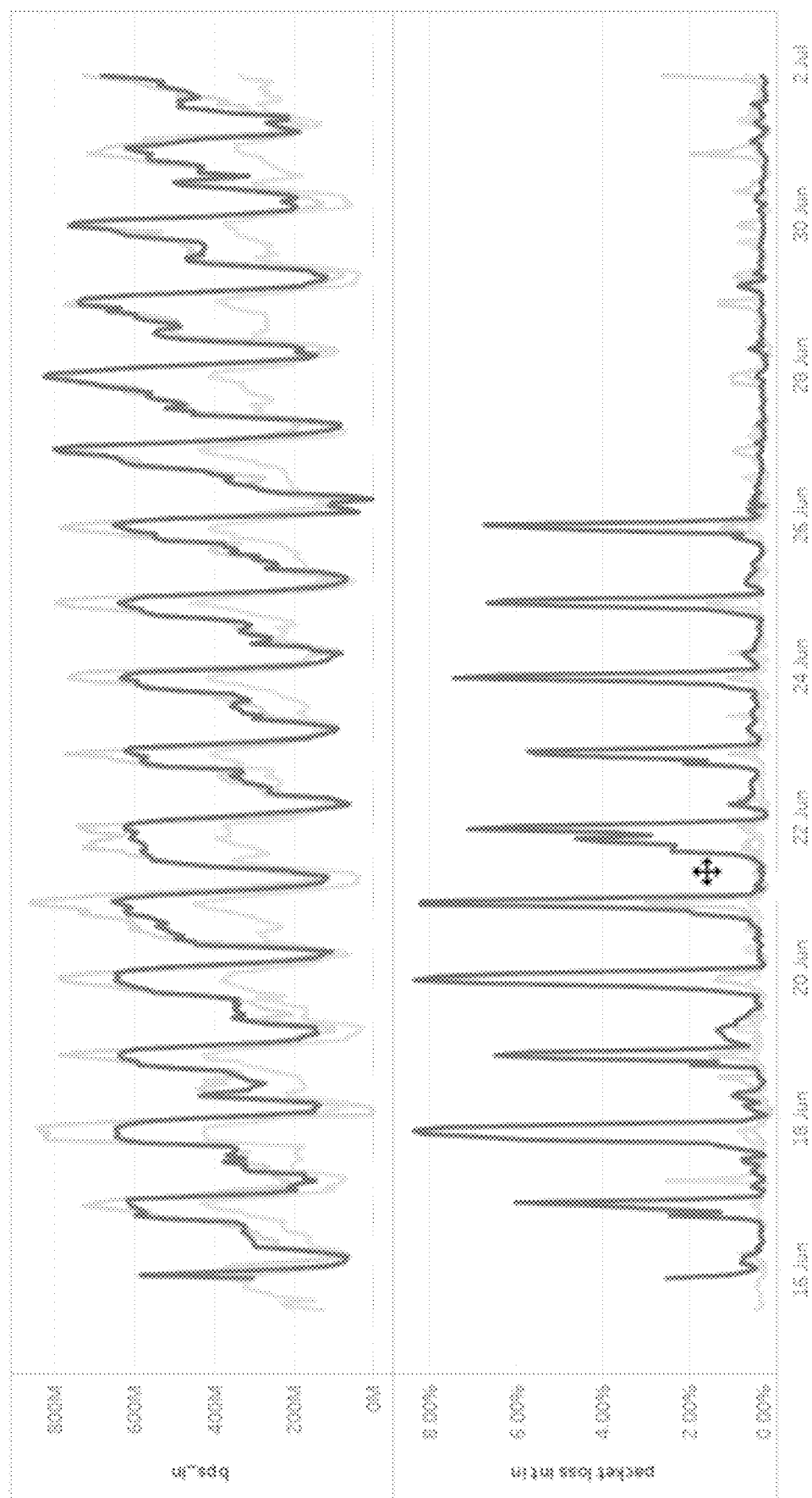
FIG. 16 is a graph illustrating Throughput and Loss measurements for a congested backhaul.

FIG. 16 shows the Throughput vs Loss plot for a congested microwave backhaul link. All the cells associated with this microwave backhaul will show up as being congested by the system, and as shown in FIGS. 11 and 12, even though it is the microwave links that are likely congested and not the cell sites associated with the backhaul.

The system is configured to determine the Throughput vs Loss Pearson correlation for all the cell sites. This correlation may be single number for a given day.

The system may further identify the backhaul corresponding to the identified candidate congested cell sites. A mapping between the cell sites and their respective backhaul is usually available, via the network operator and may be retrieved from a network device or database by the system. It is not necessary to know the topology between the cell site and the backhaul as long as the backhaul carries the traffic for the cell site back to the core network.

If the Pearson number correlation is high, then it suggests that the backhaul is congested, even though it may appear from FIGS. 11 and 12 that the cell site is congested. If the system determines that it is the backhaul that is congested, various traffic actions may be implemented via the traffic action module, for example, traffic shaping, prioritization charges, or the like, in order to address the congestion. If the traffic measures have been implemented and the backhaul is still congested the system may notify the network operators that an upgrade or additional capacity is required in order to reduce the congestion.

The system may also be configured to provide the network operator a list of all the cell sites that in fact have backhaul congestion (which may be determined from high throughput to loss Pearson correlation)

After the cells with backhaul congestion are determined and removed from the candidate selected cells determined by the correlations, the remaining cells are identified as having RAN congestion. The system is configured to alert the network operator of these cells, and in some cases of the trends associated with the cells.

In another embodiment, it is possible to precede with first determining the cells that have backhaul congestion. The system may then observe the remaining cells to see which of the remaining cells have high correlation, and a substantial number of Heavy Users and Suffering Users. The system may determine the congested cells from the remaining cells, after the backhaul congested cells have already been identified.

In scenarios where there is both backhaul congestion and cell congestion, there will be a strong positive Pearson correlation between throughput and RTT, and a strong positive Pearson correlation between throughput and loss. In addition, there will be a significant fraction of HU and SU as a percentage of the total number of users in the cells. In those instances, it is likely that both the backhaul and the cell are congested and these situations may be flagged by the system as such.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. For example, specific details are not provided as to whether the embodiments or elements thereof described herein are implemented as a software routine, hardware circuit, firmware, or a combination thereof.

Embodiments of the disclosure or elements thereof may be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for managing mobile network congestion, the method comprising:
    determining cell metrics over a predetermined time interval for each cell of a plurality of cells of the mobile network wherein the cell metrics are determined from measurements taken over an SGi interface and comprise throughput as the number of bytes sent over the SGi interface toward the cell;
    determining correlations between the cell metrics for each cell, wherein at least one correlation is a Pearson correlation between throughput and loss;
    determining whether any cell of the plurality of cells are congested based on the correlations;
    determining a type of congestion for any cell determined to be congested; and
    determining traffic actions based on the type of congestion.

2. A method according to claim 1 wherein the mobile network is a radio access network.

3. A method according to claim 1 wherein cell metrics comprise: subscriber metrics associated with each cell and traffic metrics associated with each cell.

4. A method according to claim 1 wherein determining cell metrics comprises:
    determining heavy users for each cell wherein a heavy user is a subscriber having throughput above a predetermined throughput threshold; and
    determining suffering users for each cell, wherein a suffering user is a subscriber having round trip time above a predetermined round trip time threshold.

5. A method according to claim 3 wherein traffic metrics further comprise: Round Trip Time.

6. A method according to claim 1 wherein if the Pearson correlation is greater than a predetermined threshold the cell is considered congested.

7. A method according to claim 1 wherein a cell is considered congested if the cell is experiencing higher than an average network number of heavy users, and of suffering users and a correlation between cell metrics above a predetermined threshold.

8. A method according to claim 1 wherein the type of congestion is backhaul congestion or cell congestion.

9. A method according to claim 8 wherein if the type of congestion is backhaul congestion, the traffic action is to reprioritize a traffic flow accessing the backhaul.

10. A system for managing mobile network congestion, the system comprising:
    a collection module configured to determine cell metrics over a predetermined time interval for each cell of a plurality of cells of the mobile network wherein the cell metrics are determined from measurements taken over an SGi interface and comprise throughput as the number of bytes sent over the SGi interface toward the cell;
    a correlation module configured to determine correlations between the cell metrics for each cell, wherein at least one correlation is a Pearson correlation between throughput and loss;
    an analysis module configured to determine whether any cell of the plurality of cells are congested based on the correlations and a type of congestion for any cell determined to be congested; and
    a traffic action module configured to determine traffic actions based on the type of congestion.

11. A system according to claim 10 wherein the mobile network is a radio access network.

12. A system according to claim 10 wherein the collection module is configured to determine:
    subscriber metrics associated with each cell and traffic metrics associated with each cell of the plurality of cells.

13. A system according to claim 10 wherein the collection module is further configured to:
    determine heavy users for each cell wherein a heavy user is a subscriber having throughput above a predetermined throughput threshold; and
    determine suffering users for each cell, wherein a suffering user is a subscriber having round trip time above a predetermined round trip time threshold.

14. A system according to claim 10 wherein the collection module is further configured to determine Round Trip Time.

15. A system according to claim 10 wherein if the Pearson correlation is greater than a predetermined threshold the cell is considered congested.

16. A system according to claim 10 wherein a cell is considered congested if the cell is experiencing higher than an average network number of heavy users, and of suffering users and a correlation between cell metrics above a predetermined threshold.

17. A system according to claim 10 wherein the analysis module is configured to determine whether the congestion is backhaul congestion or cell congestion.

18. A system according to claim 17 wherein if the type of congestion is backhaul congestion, the traffic action module is configured to reprioritize a traffic flow accessing the backhaul.

* * * * *